(12) United States Patent
Yin et al.

(10) Patent No.: US 8,870,289 B2
(45) Date of Patent: Oct. 28, 2014

(54) FOLDABLE LEG REST

(71) Applicant: Wan-Yu Li, Taipei (TW)

(72) Inventors: Qing-Kun Yin, Guangdong (CN);
Chin-Chen Chang, Taipei (TW)

(73) Assignee: Wan-Yu Li, Taipei (TW)

( * ) Notice: Subject to any disclaimer, the term of this patent is extended or adjusted under 35 U.S.C. 154(b) by 52 days.

(21) Appl. No.: 13/795,869

(22) Filed: Mar. 12, 2013

(65) Prior Publication Data

US 2013/0313882 A1 Nov. 28, 2013

(30) Foreign Application Priority Data

May 25, 2012 (CN) .......................... 2012 1 0167162

(51) Int. Cl.
*A47C 1/02* (2006.01)
*A47C 7/50* (2006.01)
*B60N 2/44* (2006.01)
*B60N 2/02* (2006.01)

(52) U.S. Cl.
CPC .............. *A47C 7/506* (2013.01); *B60N 2/4495* (2013.01); *B60N 2002/0236* (2013.01)
USPC .............. 297/423.22; 297/423.19; 297/423.2; 297/423.23

(58) Field of Classification Search
CPC ........ A47C 1/02; A47C 1/034; A47C 1/0342; A47C 7/50; A47C 7/503; A47C 7/506; B60N 2/4495

USPC .............. 297/69, 70, 75, 76, 423.19, 423.26, 297/423.28, 423.3
See application file for complete search history.

(56) References Cited

U.S. PATENT DOCUMENTS

| 251,655 | A | * | 12/1881 | Luketa ........................... 24/610 |
| 6,095,610 | A | * | 8/2000 | Okajima et al. ......... 297/423.36 |
| 7,121,627 | B2 | * | 10/2006 | Gaikwad et al. ......... 297/423.36 |
| 7,201,451 | B2 | * | 4/2007 | Baumann ................. 297/423.36 |
| 7,229,134 | B2 | * | 6/2007 | Ito ............................. 297/423.26 |
| 7,325,878 | B1 | * | 2/2008 | Dehli ......................... 297/423.2 |
| 2005/0173963 | A1 | * | 8/2005 | Edrich et al. ............. 297/423.28 |
| 2006/0186721 | A1 | * | 8/2006 | Flory et al. ............... 297/423.36 |

* cited by examiner

*Primary Examiner* — Philip Gabler
(74) *Attorney, Agent, or Firm* — The Weintraub Group, P.L.C.

(57) ABSTRACT

A foldable leg rest has a slide base, a first folding assembly, a second folding assembly, a first stage drive mechanism and a second stage drive mechanism. The slide base has a slide frame. The first folding assembly has a first frame pivotally connected to the slide frame. The second folding assembly has a second frame pivotally connected to the first frame. In use, the first stage drive mechanism is operated to drive the first frame to pivot relative to the slide frame and the second stage drive mechanism is operated to drive the second frame to pivot relative to the first frame. Therefore, the legs of a sitter can be stretched and placed on the folding assemblies so as to enhance comfort and minimize fatigue.

20 Claims, 12 Drawing Sheets

FOLDABLE LEG REST

CROSS REFERENCE TO RELATED APPLICATION

This application claims priority to Chinese Patent Application No. 201210167162.5, filed May 25, 2012, which is incorporated herein by reference in its entirety.

BACKGROUND OF THE INVENTION

1. Field of the Invention

The present invention relates to a leg rest, and more particularly to a foldable leg rest mounted on a seat of a chair for supporting the legs of a sitter in a stretched position.

2. Description of the Prior Arts

Chairs allow people to sit thereon and support weights of sitters. A conventional chair substantially comprises a seat and a backrest for supporting the back of a sitter. The backrest may be adjustable in angle relative to the seat by an angle adjuster to fit different needs of different sitters.

However, when a person sits on the chair for a long time, for example on a long vehicle trip, the legs of the sitter on the conventional chair will become tired and numb, or pain due to long time of bending. Accordingly, the conventional chair should be further improved to provide an enhanced comfort for the sitter.

To overcome the shortcomings, the present invention provides a foldable leg to mitigate or obviate the aforementioned problems.

SUMMARY OF THE INVENTION

The present invention provides a foldable leg rest that supports the legs of a sitter in a stretched position.

A foldable leg rest in accordance with the present invention comprises a slide base, a first folding assembly, a second folding assembly, a first stage drive mechanism and a second stage drive mechanism. The slide base includes a slide frame and two supporting arms. The slide frame has two sides and a front end. The supporting arms are respectively slidably mounted on the sides of the slide frame and each supporting arm has a front end, a projection, a rolling bearing and a roller. The projection extends from the front end of the supporting arm. The rolling bearing and the roller are mounted on the projection. The first folding assembly includes a first frame and two guide pieces. The first frame has a front end, a rear end and a bottom surface. The rear end of the first frame is pivotally connected to the front end of the slide frame. The guide pieces are respectively secured to two side portions of the bottom surface of the first frame and each guide piece has a guide slot for allowing the projection of a corresponding supporting arm to extend therethrough and to move thereal­ong. The second folding assembly includes a second frame having a rear end pivotally connected to the front end of the first frame. The first stage drive mechanism is mounted on the slide base. The second stage drive mechanism is mounted on the first frame. In use, the first stage drive mechanism is operated to drive the first frame to pivot relative to the slide base and the second stage drive mechanism is operated to drive the second frame to pivot relative to the first frame. Therefore, the legs of a sitter can be stretched and placed on the folding assemblies so as to enhance comfort and minimize fatigue.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
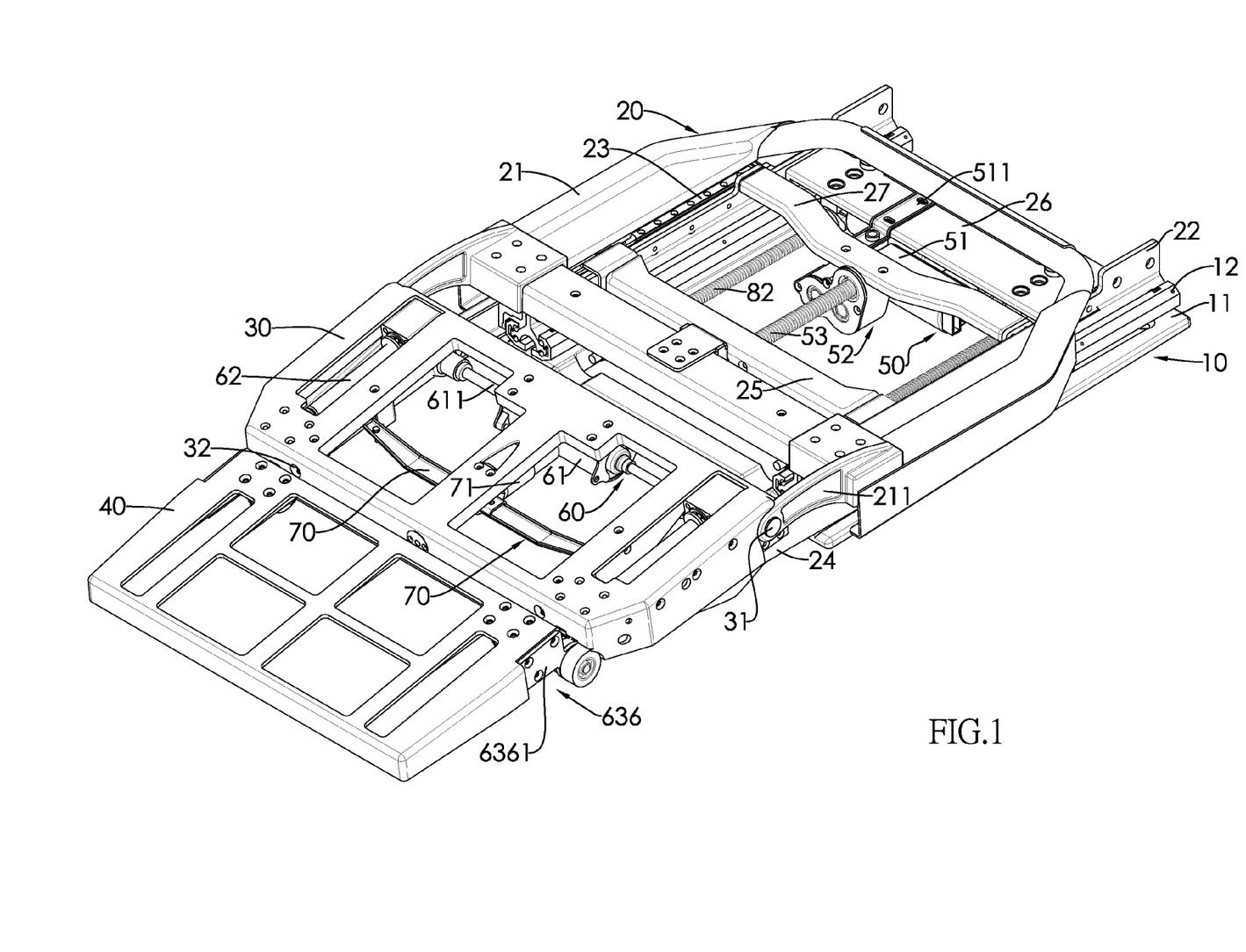
FIG. 1 is a top perspective view of a foldable leg rest in accordance with the present invention shown in an unfolded state.
Figure 2:
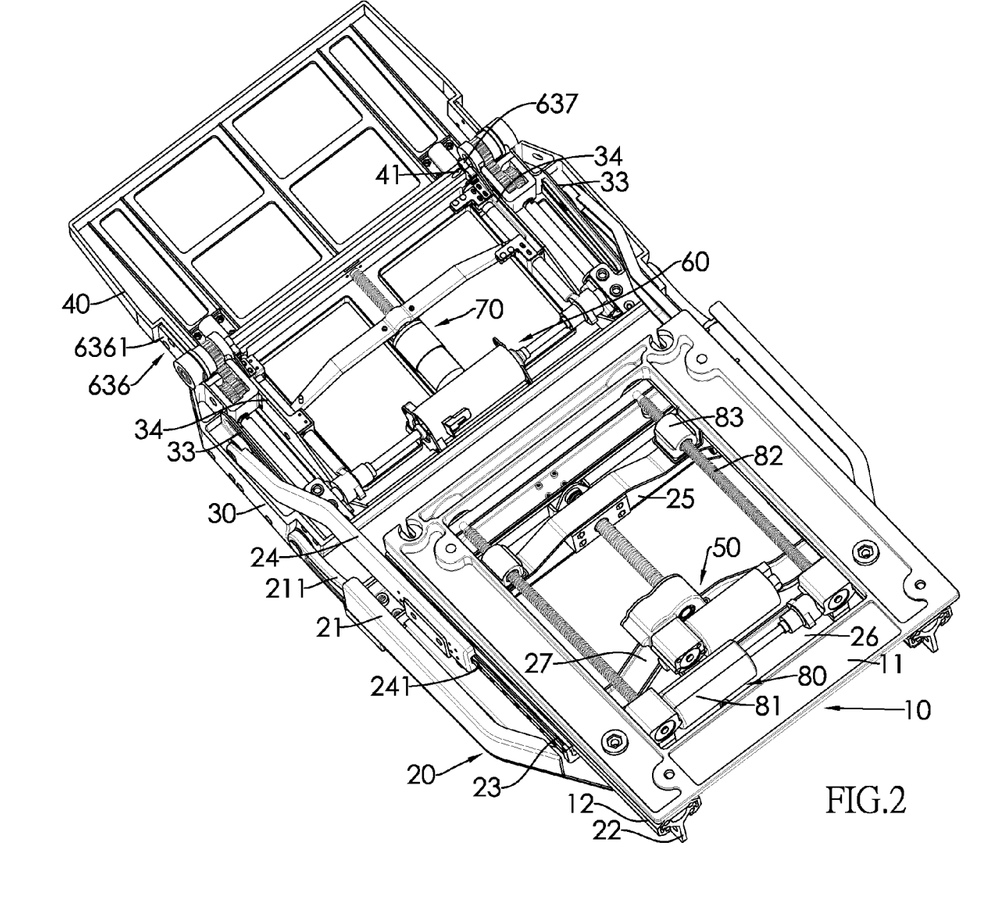
FIG. 2 is a bottom perspective view of the foldable leg rest in FIG. 1 shown in an unfolded state.

With reference to FIGS. 1 and 2, a foldable leg rest in accordance with the present invention comprises a mounting bracket 10, a slide base 20, a first folding assembly, a second folding assembly, a first stage drive mechanism 50, a second stage drive mechanism 60, a third stage drive mechanism 70 and a fourth stage drive mechanism 80.

The mounting bracket 10 includes a mounting frame 11 and two tracks 12. The mounting frame 11 has two sides. The tracks 12 are respectively secured to the sides of the mounting frame 11.

Figure 3:
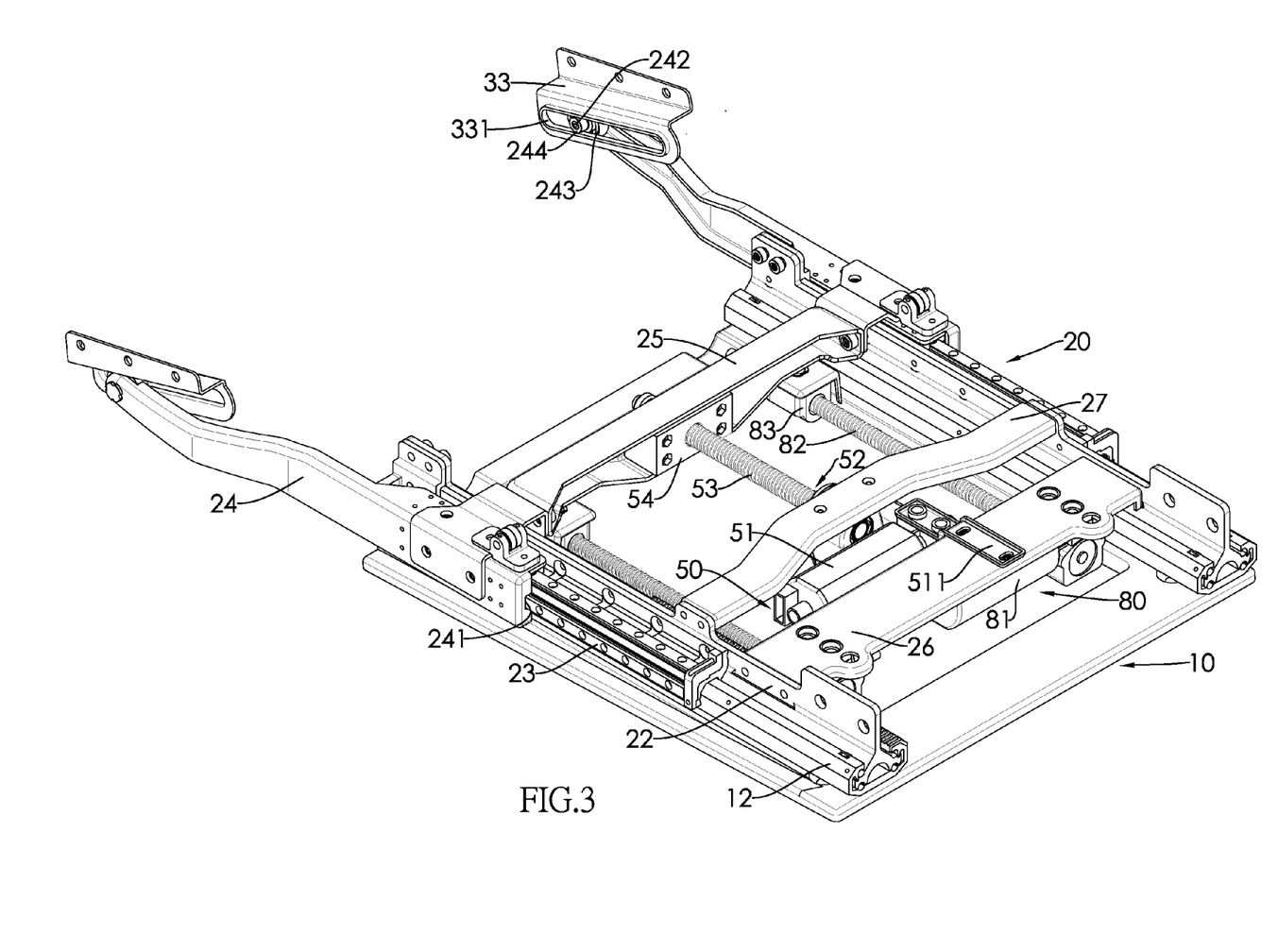
FIG. 3 is a perspective view of a mounting bracket and a slide base of the foldable leg rest in FIG. 1.

With reference to FIGS. 1 and 3, the slide base 20 is slidably mounted on the mounting bracket 10 and includes a slide frame 21, two first slide blocks 22, two second slide blocks 23, two supporting arms 24, a driven board 25, a first mounting board 26 and a second mounting board 27. The slide frame 21 has two sides, a front end and two pivot pieces 211. The pivot pieces 211 respectively extend from two sides of the front end of the slide frame 21. The first slide blocks 22 are respectively secured to the sides of the slide frame 21, respectively slidably engage the tracks 12 of the mounting bracket 10 and each first slide block 22 has a middle portion, a rear portion and an outer surface. The second slide blocks 23 are respectively secured to the outer surfaces of the first slide blocks 22. The supporting arms 24 are respectively slidably mounted on the sides of the slide frame 21 and each supporting arm 24 has a front end, a rear portion, a chute 241, a projection 242, a rolling bearing 243 and a roller 244. The chute 241 is formed in the rear portion of the supporting arm 24 for allowing a corresponding second slide block 23 to slidably engage therewith. The front end of the supporting arm 24 protrudes out of the front end of the slide frame 21. The projection 242 extends from the front end of the supporting arm 24. The rolling bearing 243 and the roller 244 are mounted on the projection 242. The driven board 25 has its opposite ends respectively secured to the rear portions of the supporting arms 24. The first mounting board 26 has its opposite ends respectively secured to the rear portions of the first slide blocks 22. The second mounting board 27 has its opposite ends respectively secured to the middle portions of the first slide blocks 22.

Figure 7:
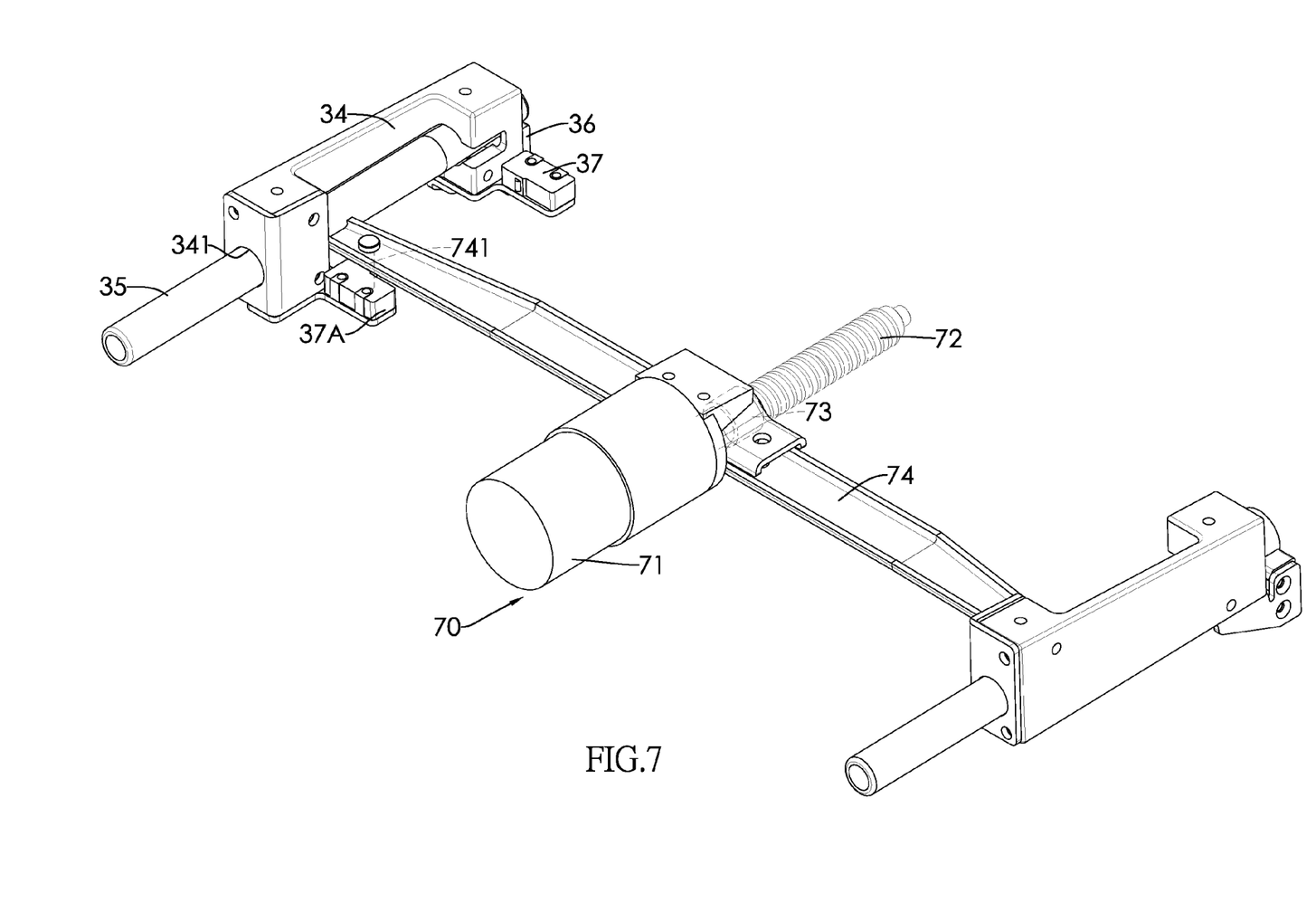
FIG. 7 is an enlarged perspective view of a third stage drive mechanism of the foldable leg rest in FIG. 1.

With further reference to FIG. 7, the first folding assembly includes a first frame 30, two pivot pins 31, two guide pieces 33, two limit blocks 34, two insertion rods 35, two first contact switches 36, a second front contact switch 37 and a second rear contact switch 37A. The first frame 30 is pivotally connected to the slide frame 21 and has a bottom surface, two sides, a front wall and two bores 32. The bottom surface of the first frame 30 has two side portions, a middle portion and a rear portion. Each side of the first frame 30 has a front end and a rear end. The front wall of the first frame 30 has two sides. The bores 32 are respectively formed through the sides of the front wall of the first frame 30. The pivot pins 31 are respectively mounted through the pivot pieces 211 of the slide frame 21 and the rear ends of the sides of the first frame 30 to connect the slide frame 21 and the first frame 30 pivotally. The guide pieces 33 are respectively secured to the side portions of the bottom surface of the first frame 30 and respectively correspond to the supporting arms 24 of the slide base 20. Each guide piece 33 has a guide slot 331 for allowing the projection 242 of the corresponding supporting arm 24 to extend therethrough and to move therealong. The limit blocks 34 are respectively secured to the side portions of the bottom surface of the first frame 30 between the guide pieces 33. Each limit block 34 has an inner surface, a front surface and a hole 341. The holes 341 of the two limit blocks 34 respectively align with the bores 32 of the front wall of the first frame 30. The insertion rods 35 are respectively movably inserted in the holes 341 of the limit blocks 34. The first contact switches 36 are respectively secured to the front surfaces of the limit blocks 34. The second front and rear contact switches 37, 37A are respectively secured to front and rear portions of the inner surface of one of the limit blocks 34.

With reference to FIGS. 1 and 2, the second folding assembly includes a second frame 40. The second frame 40 is pivotally connected to the first frame 30 and has two sides, a rear wall and two bores 41. Rear ends of the sides of the second frame 40 are respectively pivotally connected to the front ends of the sides of the first frame 30. The rear wall of the second frame 40 has two sides. The bores 41 are respectively formed through the sides of the rear wall of the second frame 40 and respectively align with the bores 32 of the first frame 30.

Figure 4:
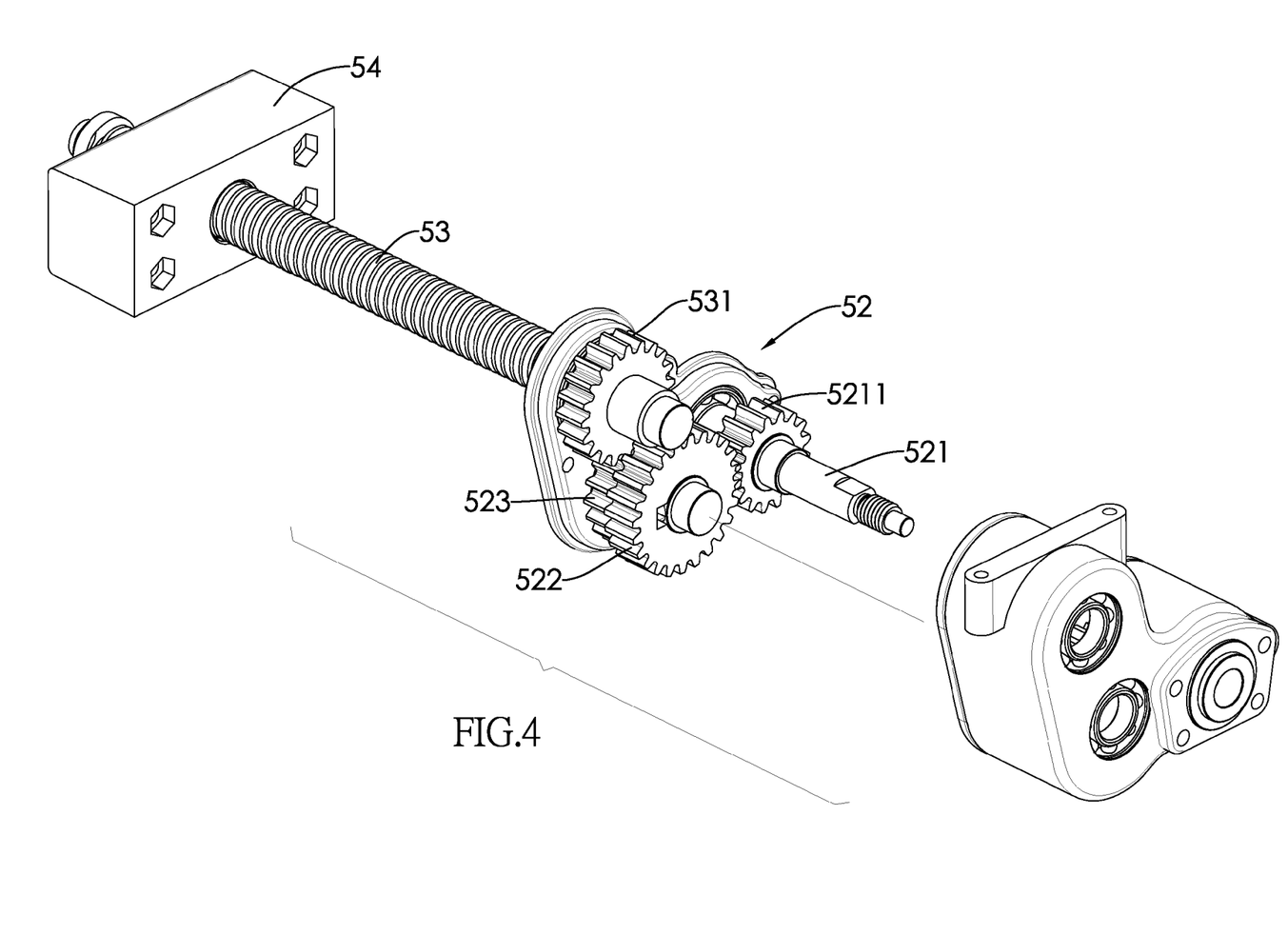
FIG. 4 is a partially enlarged exploded perspective view of a first stage drive mechanism of the foldable leg rest in FIG. 1.

With reference to FIGS. 1 and 3, the first stage drive mechanism 50 is mounted on the slide base 20, is operated to drive the first frame 30 to pivot relative to the slide base 20 and includes a first stage direct current (DC) motor 51, a first stage gearing 52, a first stage threaded rod 53 and a first stage nut 54. The first stage DC motor 51 is secured to the first mounting board 26 of the slide base 20 by a connecting member 511. With further reference to FIG. 4, the first stage gearing 52 has a housing secured to the second mounting board 27 of the slide base 20 and receiving a first stage pivot shaft 521, a first stage first gear 522 and a first stage second gear 523. The pivot shaft 521 is driven by the DC motor 51 and has a gear 5211 formed on one end thereof. The first stage first gear 522 meshes with the gear 5211 of the pivot shaft 521. The first stage second gear 523 is coaxially mounted on the first stage first gear 522. The first stage threaded rod 53 has a gear 531 formed on one end thereof and meshing with the first stage second gear 523. The first stage nut 54 is screwed onto the first stage threaded rod 53 and is secured to the driven board 25 of the slide base 20 so that the first stage nut 54 is longitudinally movable along the threaded rod 53.

Figure 5:
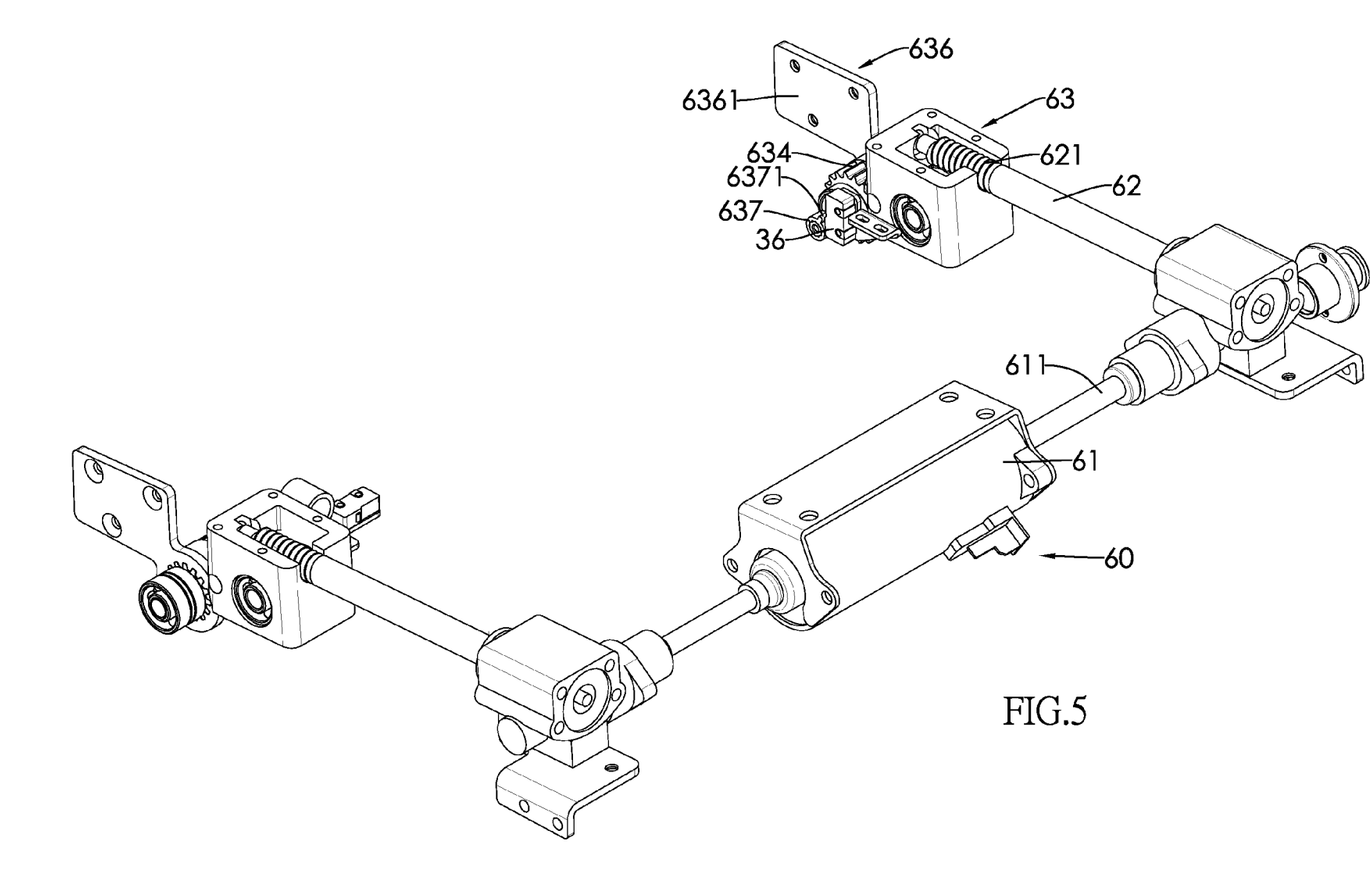
FIG. 5 is an enlarged perspective view of a second stage drive mechanism of the foldable leg rest in FIG. 1.

With reference to FIGS. 1 and 5, the second stage drive mechanism 60 is mounted on the first frame 30, is operated to drive the second frame 40 to pivot relative to the first frame 30 and includes a second stage DC motor 61, two second stage driving rods 62 and two second stage gearings 63. The second stage DC motor 61 is secured to the rear portion of the bottom surface of the first frame 30 and has two ends and two flexible shafts 611. The flexible shafts 611 are respectively connected to the ends of the second stage DC motor 61. Each second stage driving rod 62 is driven by a corresponding flexible shaft 611 of the second stage DC motor 61 and has a worm 621 formed on one end thereof. The second stage gearings 63 are each respectively mounted between the front end of one of the sides of the first frame 30 and the rear end of one of the sides of the second frame 40.

Figure 6:
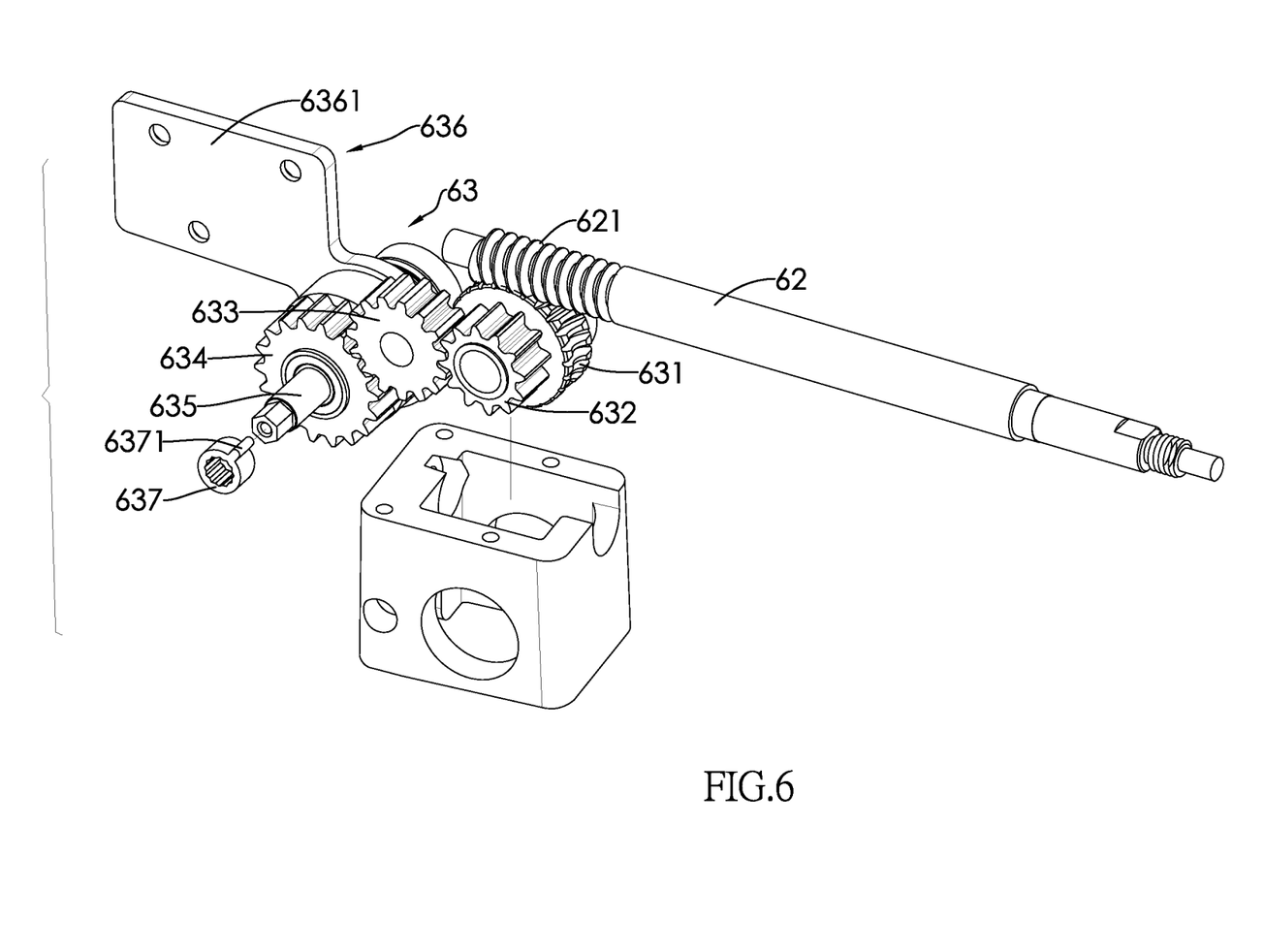
FIG. 6 is a partially enlarged exploded perspective view of the second stage drive mechanism of the foldable leg rest in FIG. 1.

With further reference to FIG. 6, each second stage gearing 63 has a housing secured to the bottom surface of the first frame 30 and receiving a worm gear 631, a second stage first gear 632 and a second stage second gear 633. The worm gear 631 meshes with the worm 621 of a corresponding second stage driving rod 62. The second stage first gear 632 is coaxially mounted on the worm gear 631. The second stage second gear 633 meshes with the second stage first gear 632. Each second stage gearing 63 further has a second stage third gear 634, a second stage pivot shaft 635, a connecting element 636 and a contacting element 637. The second stage third gear 634 meshes with the second stage second gear 633. The second stage pivot shaft 635 is coaxially and securely mounted through the second stage third gear 634 and has an inner end and an outer end respectively extending from opposite side surfaces of the second stage third gear 634. The connecting element 636 is secured to the outer end of the second stage pivot shaft 635 and has a connecting piece 6361 extending therefrom and secured to the rear end of a corresponding side of the second frame 40. The contacting element 637 is secured to the inner end of the second stage pivot shaft 635 and has a contacting projection 6371 extending therefrom and being contactable with a corresponding first contact switch 36.

With reference to FIGS. 1, 2 and 7, the third stage drive mechanism 70 is mounted on the first frame 30, is operated to drive the insertion rods 35 to move in the holes 341 of the limit blocks 34 and includes a third stage DC motor 71, a third stage threaded rod 72, a third stage nut 73 and a wing 74. The third stage DC motor 71 is secured to the middle portion of the bottom surface of the first frame 30. The third stage threaded rod 72 is driven by the third stage DC motor 71 and has a front end rotatably mounted on the front wall of the first frame 30. The third stage nut 73 is screwed onto the third stage threaded rod 72 and is longitudinally movable thereon. The wing 74 has a bottom surface, a central portion, opposite ends and a contacting rod 741. The central portion of the wing 74 is secured to the third stage nut 73. The ends of the wing 74 are respectively secured to middle portions of the insertion rods 35. The contacting rod 741 extends from one side of the bottom surface of the wing 74, is contactable with the second front or rear contact switch 37, 37A.

With reference to FIGS. 2 and 3, the fourth stage drive mechanism 80 is mounted on the slide base 20, is operated to drive the slide base 20 to move relative to the mounting bracket 10 and includes a fourth stage DC motor 81, two fourth stage threaded rods 82 and two fourth stage nuts 83. The fourth stage DC motor 81 is secured to the first mounting board 26 of the slide base 20. The fourth stage threaded rods 82 are respectively disposed at sides of the fourth stage DC motor 81 and are driven by the fourth stage DC motor 81. The fourth stage nuts 83 are respectively screwed onto the fourth stage threaded rods 82 and are respectively secured to inner surfaces of the tracks 12 of the mounting bracket 10 so that the fourth stage threaded rods 82 are longitudinally movable relative to the fourth stage nuts 83.

Figure 8:
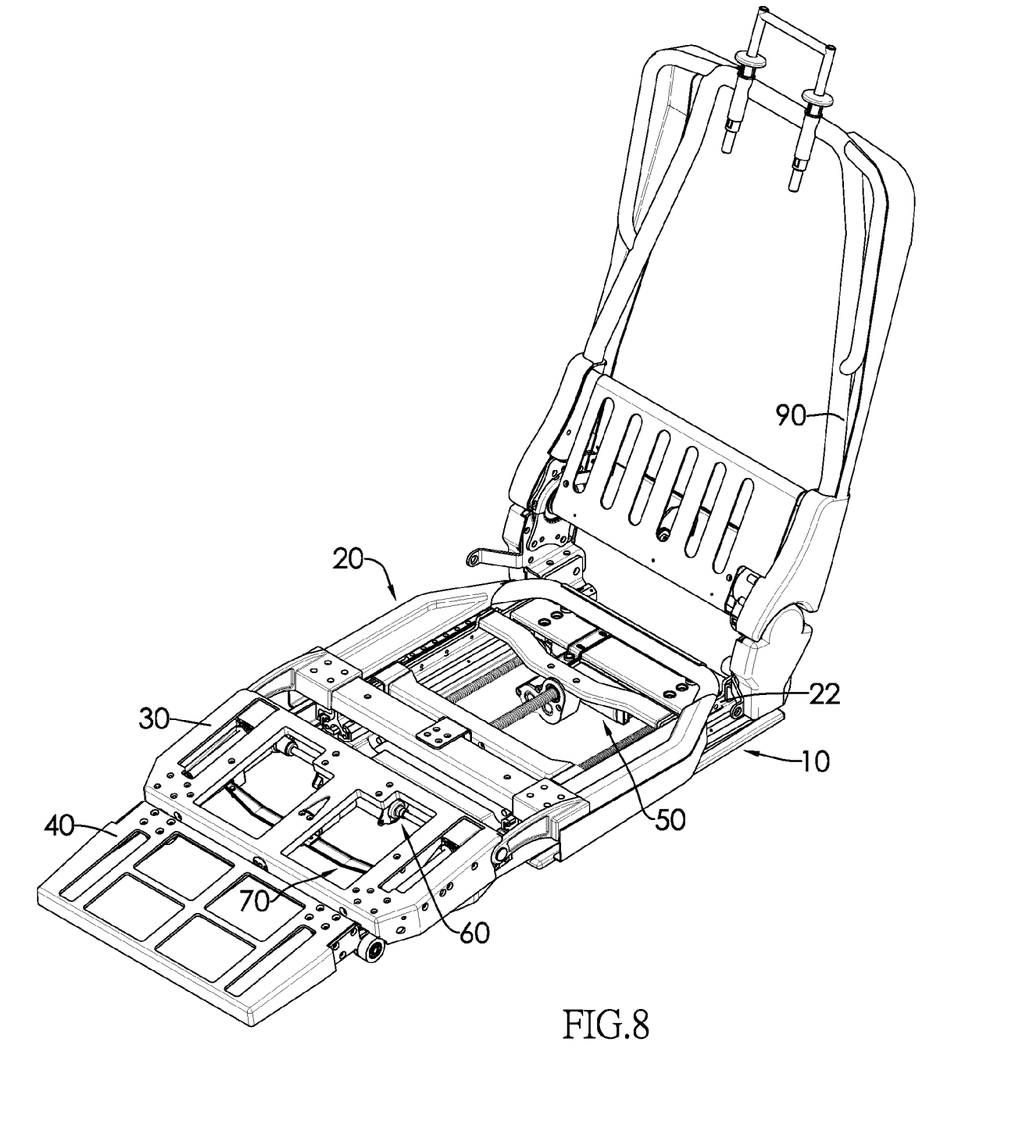
FIG. 8 is a perspective view of a chair with the foldable leg rest in FIG. 1.
Figure 9:
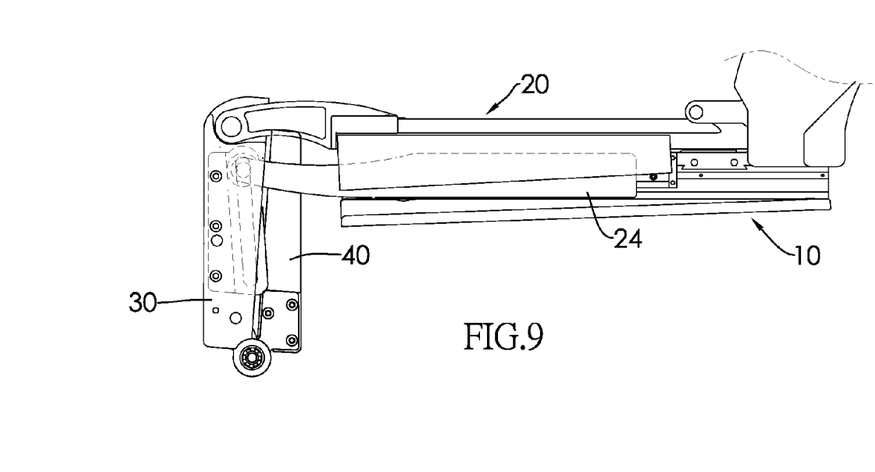
FIGS. 9 to 13 are operational side views of the foldable leg rest in FIG. 1.
Figure 10:
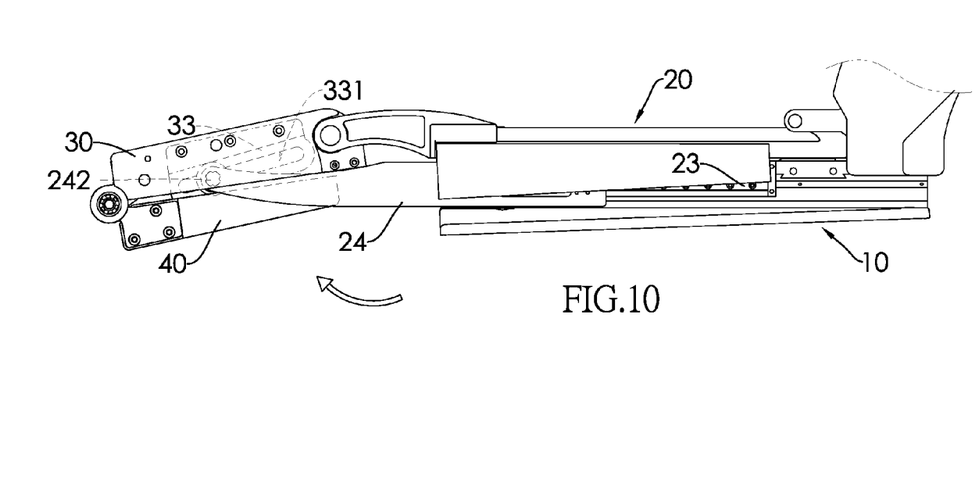

With reference to FIG. 8, the foldable leg rest in accordance with the present invention is applied to a chair that comprises a seat (not shown) and a backrest 90. The mounting bracket 10 is connected to the seat, and rear ends of the first slide blocks 22 of the slide base 20 are connected to the backrest 90. With reference to FIG. 9, the leg rest is in a folded state. To unfold the leg rest, with reference to FIGS. 3, 4 and 10, the first stage DC motor 51 is switched on and drives the pivot shaft 521 to rotate, the first stage nut 54 is then moved forward along the first stage threaded rod 53 with the transmission of the first stage first gear 522, the first stage second gear 523 and the first stage threaded rod 53, and the driven board 25 to which the first stage nut 54 is secured is then driven to make the chutes 241 of the supporting arms 24 slide relative to the second slide blocks 23 and to make the projections 242 of the supporting arms 24 move along the guide slots 331 of the guide pieces 33. Thus, the first frame 30 can be pivoted forward relative to the slide base 20.

Figure 11:
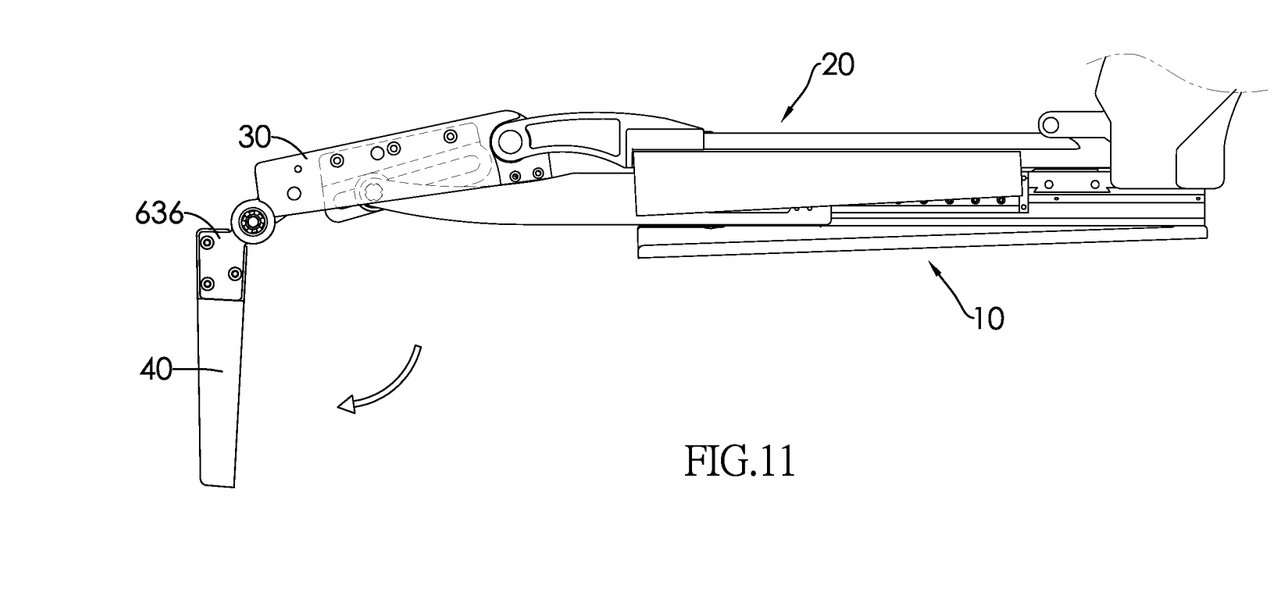
Figure 12:
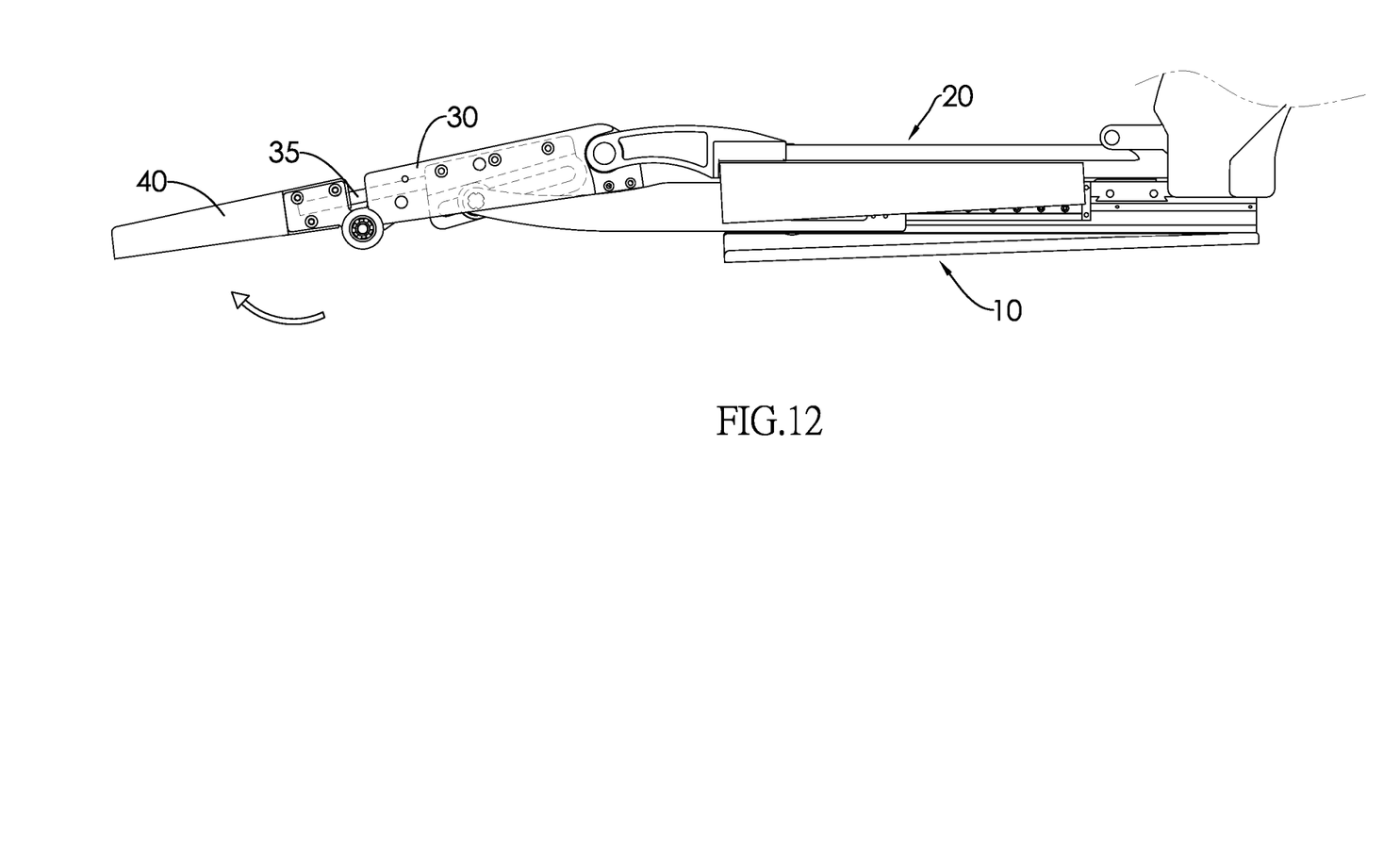

With reference to FIGS. 5, 6 and 11, the second stage DC motor 61 is switched on and drives the second stage driving rods 62 to rotate, and the second frame 40 can be pivoted forward relative to the first frame 30 with the transmission of the worm gears 631, the second stage first gears 632, the second stage second gears 633, the second stage third gears 634, the second stage pivot shafts 635 and the connecting elements 636. With reference to FIGS. 5 and 12, when the second frame 40 is pivoted forward 180 degrees relative to the first frame 30, the contacting projections 6371 of the contacting elements 637 will contact the first contact switches 36. An electric circuit connected to the first contact switches 36 can be detected to determine if the electric circuit is a loop circuit and to determine if the second stage DC motor 61 should be switched off, thus ensuring that the second frame 40 completes 180 degrees of pivoting.

With reference to FIGS. 7 and 12, the third stage DC motor 71 is switched on and drives the third stage threaded rod 72 to rotate, the third stage nut 73 is then moved forward along the third stage threaded rod 72 with the threaded engagement between the third stage threaded rod 72 and the third stage nut 73, and the wing 74 to which the third stage nut 73 is secured is then driven to make the insertion rods 35 move forward in the holes 341 of the limit blocks 34 and pass through the bores 32 of the first frame 30 and the bores 41 of the second frame 40. Accordingly, front ends and rear ends of the insertion rods 35 are respectively disposed in the first frame 30 and the second frame 40 so as to reinforce the first frame 30 and the second frame 40. The insertion rods 35 can move forward until the contacting rod 741 of the wing 74 contacts the second front contact switch 37. An electric circuit connected to the second front contact switch 37 can be detected to determine if the electric circuit is a loop circuit and to determine if the third stage DC motor 71 should be switched off, thus ensuring that the insertion rods 35 complete their movement.

Figure 13:
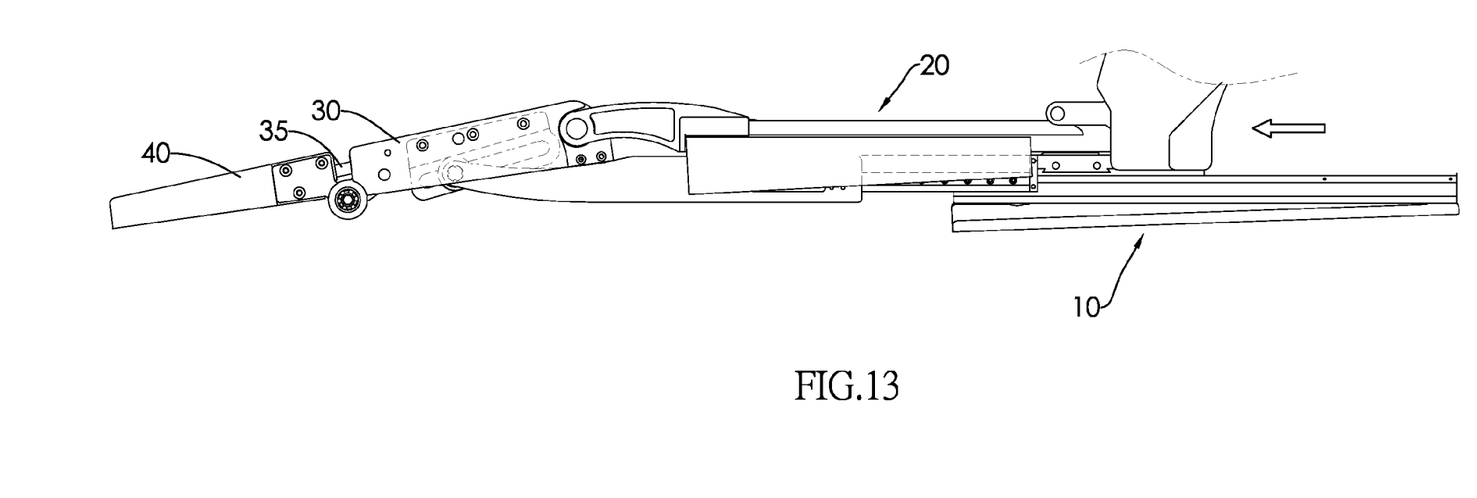

With reference to FIGS. 3 and 13, the fourth stage DC motor 81 is switched on and drives the fourth stage threaded rods 82 to rotate, the fourth stage threaded rods 82 are then moved forward relative to the fourth stage nuts 83 with the threaded engagement between the fourth stage threaded rods 82 and the fourth stage nuts 83, and the first mounting board 26 to which the fourth stage DC motor 81 is secured is then driven to make the first slide blocks 22 slide relative to the tracks 12. Thus, the slide base 20 and the first and second frames 30, 40 can be moved forward relative to the mounting bracket 10 for allowing a sitter to adjust the space for sitting.

The leg rest in accordance with the present invention includes the folding assemblies to extend its length. Therefore, the legs of the sitter can be stretched and placed on the folding assemblies so as to enhance comfort and minimize fatigue. In addition, the insertion rods 35 passing through the first frame 30 and the second frame 40 can reinforce the strength of the leg rest and prevent collapse thereof.

To fold the leg rest in accordance with the present invention, with reference to FIG. 3, the fourth stage DC motor 81 is switched on and drives the slide base 20 and the first and second folding frames 30, 40 to move rearward relative to the mounting bracket 10. With reference to FIG. 7, the third stage DC motor 71 is switched on and drives the wings 74 and the insertion rods 35 to move rearward. When the contacting rod 741 of the wing 74 contacts the second rear contact switch 37A, the insertion rods 35 complete their return movement. With reference to FIG. 1, the second stage DC motor 61 is switched on and drives the second frame 40 to pivot toward the bottom surface of the first frame 30. The first stage DC motor 51 is switched on and drives the first frame 30 to pivot rearward. Therefore, an area of the leg rest is reduced and to arrange or store the leg rest is convenient.

Even though numerous characteristics and advantages of the present invention have been set forth in the foregoing description, together with details of the structure and features of the invention, the disclosure is illustrative only. Changes may be made in the details, especially in matters of shape, size and arrangement of parts within the principles of the invention to the full extent indicated by the broad general meaning of the terms in which the appended claims are expressed.

What is claimed is:

1. A foldable leg rest comprising:
   a slide base including:
      a slide frame having two sides and a front end; and
      two supporting arms respectively slidably mounted on the sides of the slide frame and each supporting arm having:
         a front end;
         a projection extending from the front end of the supporting arm; and
         a rolling bearing and a roller mounted on the projection;
   a first folding assembly including:
      a first frame having:
         a front end;
         a rear end pivotally connected to the front end of the slide frame; and
         a bottom surface having two side portions; and
      two guide pieces respectively secured to the side portions of the bottom surface of the first frame and each guide piece having a guide slot for allowing the projection of a corresponding supporting arm to extend therethrough and to move therealong;
   a second folding assembly including a second frame having a rear end pivotally connected to the front end of the first frame;
   a first stage drive mechanism mounted on the slide base and operated to drive the supporting arms to slide relative to the slide frame and to make the projections of the supporting arms move along the guide slots of the guide pieces so that the first frame is pivoted relative to the slide base; and
   a second stage drive mechanism mounted on the first frame and operated to drive the second frame to pivot relative to the first frame.

2. The foldable leg rest as claimed in claim 1, wherein the slide base includes
   a driven board having its opposite ends respectively secured to rear portions of the supporting arms; and
   a first mounting board having its opposite ends respectively secured to rear portions of the slide frame; and
the first stage drive mechanism includes
   a first stage DC motor secured to the first mounting board of the slide base;
   a first stage threaded rod driven by the first stage DC motor through a first stage gearing; and
   a first stage nut screwed onto the first stage threaded rod and secured to the driven board of the slide base so that the first stage nut is longitudinally movable along the threaded rod.

3. The foldable leg rest as claimed in claim 2, wherein the second stage drive mechanism includes
   a second stage DC motor secured to a rear portion of the first frame; and
   two second stage driving rods and two second stage gearings driven by the second stage DC motor.

4. The foldable leg rest as claimed in claim 3, wherein the first stage gearing has
   a first stage pivot shaft driven by the DC motor and having a gear formed on one end thereof;
   a first stage first gear meshing with the gear of the pivot shaft; and
   a first stage second gear coaxially mounted on the first stage first gear; and
   the first stage threaded rod has a gear formed on one end thereof and meshing with the first stage second gear.

5. The foldable leg rest as claimed in claim 4, wherein the first frame has
   a front wall having two sides; and
   two bores respectively formed through the sides of the front wall of the first frame;
the first folding assembly includes
   two limit blocks respectively secured to the side portions of the bottom surface of the first frame and each limit block having a hole, the holes of the two limit blocks respectively aligning with the bores of the front wall of the first frame; and
   two insertion rods respectively movably inserted in the holes of the limit blocks;
the second frame has
   a rear wall having two sides; and
   two bores respectively formed through the sides of the rear wall of the second frame and respectively aligning with the bores of the first frame; and
wherein the foldable leg rest further comprises a third stage drive mechanism mounted on the first frame and operated to drive the insertion rods to move in the holes of the limit blocks and to pass through the bores of the first frame and the bores of the second frame so that front ends and rear ends of the insertion rods are respectively disposed in the first frame and the second frame.

6. The foldable leg rest as claimed in claim 5, wherein the third stage drive mechanism includes
   a third stage DC motor secured to a middle portion of the first frame;
   a third stage threaded rod driven by the third stage DC motor and having a front end rotatably mounted on the front wall of the first frame;
   a third stage nut screwed onto the third stage threaded rod and being longitudinally movable thereon; and
   a wing having:
      a central portion secured to the third stage nut; and
      opposite ends respectively secured to the insertion rods.

7. The foldable leg rest as claimed in claim 6, wherein the first folding assembly includes a second front contact switch and a second rear contact switch respectively secured to front and rear portions of one of the limit blocks; and
the wing of the third stage drive mechanism has
   a bottom surface; and
   a contacting rod extending from one side of the bottom surface of the wing and being contactable with the second front or rear contact switch.

8. The foldable leg rest as claimed in claim 4, wherein each second stage driving rod has a worm formed on one end thereof;
the second stage gearings are each respectively mounted between one side of the first frame and one side of the second frame, and each second stage gearing has a housing secured to the first frame and receiving:
   a worm gear meshing with the worm of a corresponding second stage driving rod;
   a second stage first gear coaxially mounted on the worm gear; and
   a second stage second gear meshing with the second stage first gear; and
each second stage gearing further has
   a second stage third gear meshing with the second stage second gear;
   a second stage pivot shaft coaxially and securely mounted through the second stage third gear; and
   a connecting element secured to the second stage pivot shaft and having a connecting piece extending therefrom and secured to a corresponding side of the second frame.

9. The foldable leg rest as claimed in claim 8, wherein the first frame has
   a front wall having two sides; and
   two bores respectively formed through the sides of the front wall of the first frame;
the first folding assembly includes
   two limit blocks respectively secured to the side portions of the bottom surface of the first frame and each limit block having a hole, the holes of the two limit blocks respectively aligning with the bores of the front wall of the first frame; and
   two insertion rods respectively movably inserted in the holes of the limit blocks;
the second frame has
   a rear wall having two sides; and
   two bores respectively formed through the sides of the rear wall of the second frame and respectively aligning with the bores of the first frame; and
wherein the foldable leg rest further comprises a third stage drive mechanism mounted on the first frame and operated to drive the insertion rods to move in the holes of the limit blocks and to pass through the bores of the first frame and the bores of the second frame so that front ends and rear ends of the insertion rods are respectively disposed in the first frame and the second frame.

10. The foldable leg rest as claimed in claim 9, wherein the third stage drive mechanism includes
   a third stage DC motor secured to a middle portion of the first frame;
   a third stage threaded rod driven by the third stage DC motor and having a front end rotatably mounted on the front wall of the first frame;
   a third stage nut screwed onto the third stage threaded rod and being longitudinally movable thereon; and a wing having:
- a central portion secured to the third stage nut; and
- opposite ends respectively secured to the insertion rods.

11. The foldable leg rest as claimed in claim 10, wherein the first folding assembly includes a second front contact switch and a second rear contact switch respectively secured to front and rear portions of one of the limit blocks; and
the wing of the third stage drive mechanism has
- a bottom surface; and
- a contacting rod extending from one side of the bottom surface of the wing and being contactable with the second front or rear contact switch.

12. The foldable leg rest as claimed in claim 11 further comprising a mounting bracket and a fourth stage drive mechanism, wherein
the mounting bracket includes
- a mounting frame having two sides; and
- two tracks respectively secured to the two sides of the mounting frame;
the slide base includes two first slide blocks respectively secured to the sides of the slide frame and respectively slidably engaging the tracks of the mounting bracket; and
the fourth stage drive mechanism is mounted on the slide base and operated to drive the slide base to move relative to the mounting bracket.

13. The foldable leg rest as claimed in claim 12, wherein the fourth stage drive mechanism includes
- a fourth stage DC motor secured to the slide frame of the slide base;
- two fourth stage threaded rods driven by the fourth stage DC motor; and
- two fourth stage nuts respectively screwed onto the fourth stage threaded rods and respectively secured to the tracks of the mounting bracket so that the fourth stage threaded rods are longitudinally movable relative to the fourth stage nuts.

14. The foldable leg rest as claimed in claim 8, wherein
the first folding assembly includes two first contact switches respectively secured to the sides of the first frame; and
each second stage gearing has a contacting element secured to the second stage pivot shaft and having a contacting projection extending therefrom and being contactable with a corresponding first contact switch.

15. The foldable leg rest as claimed in claim 14, wherein
the first frame has
- a front wall having two sides; and
- two bores respectively formed through the sides of the front wall of the first frame;
the first folding assembly includes
- two limit blocks respectively secured to the side portions of the bottom surface of the first frame and each limit block having a hole, the holes of the two limit blocks respectively aligning with the bores of the front wall of the first frame; and
- two insertion rods respectively movably inserted in the holes of the limit blocks;
the second frame has
- a rear wall having two sides; and
- two bores respectively formed through the sides of the rear wall of the second frame and respectively aligning with the bores of the first frame; and wherein the foldable leg rest further comprises a third stage drive mechanism mounted on the first frame and operated to drive the insertion rods to move in the holes of the limit blocks and to pass through the bores of the first frame and the bores of the second frame so that front ends and rear ends of the insertion rods are respectively disposed in the first frame and the second frame.

16. The foldable leg rest as claimed in claim 15, wherein the third stage drive mechanism includes
- a third stage DC motor secured to a middle portion of the first frame;
- a third stage threaded rod driven by the third stage DC motor and having a front end rotatably mounted on the front wall of the first frame;
- a third stage nut screwed onto the third stage threaded rod and being longitudinally movable thereon; and
- a wing having:
  - a central portion secured to the third stage nut; and
  - opposite ends respectively secured to the insertion rods.

17. The foldable leg rest as claimed in claim 16, wherein the first folding assembly includes a second front contact switch and a second rear contact switch respectively secured to front and rear portions of one of the limit blocks; and
the wing of the third stage drive mechanism has
- a bottom surface; and
- a contacting rod extending from one side of the bottom surface of the wing and being contactable with the second front or rear contact switch.

18. The foldable leg rest as claimed in claim 17 further comprising a mounting bracket and a fourth stage drive mechanism, wherein
the mounting bracket includes
- a mounting frame having two sides; and
- two tracks respectively secured to the two sides of the mounting frame;
the slide base includes two first slide blocks respectively secured to the sides of the slide frame and respectively slidably engaging the tracks of the mounting bracket; and
the fourth stage drive mechanism is mounted on the slide base and operated to drive the slide base to move relative to the mounting bracket.

19. The foldable leg rest as claimed in claim 18, wherein the fourth stage drive mechanism includes
- a fourth stage DC motor secured to the slide frame of the slide base;
- two fourth stage threaded rods driven by the fourth stage DC motor; and
- two fourth stage nuts respectively screwed onto the fourth stage threaded rods and respectively secured to the tracks of the mounting bracket so that the fourth stage threaded rods are longitudinally movable relative to the fourth stage nuts.

20. The foldable leg rest as claimed in claim 1, wherein the second stage drive mechanism includes
- a second stage DC motor secured to a rear portion of the first frame; and
- two second stage driving rods and two second stage gearings driven by the second stage DC motor.

* * * * *